Figure 8:
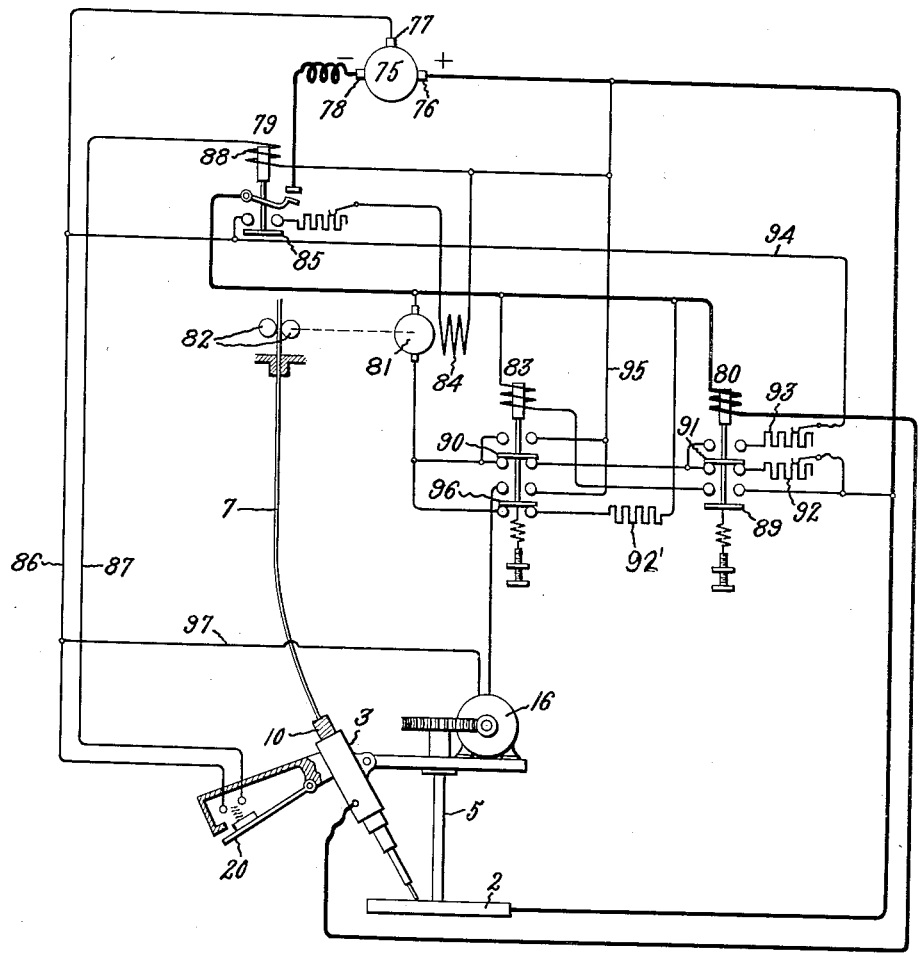

Sept. 16, 1924.
C. E. GLASSER
1,508,691
ELECTRIC ARC WELDING
Filed May 15, 1923  3 Sheets-Sheet 1
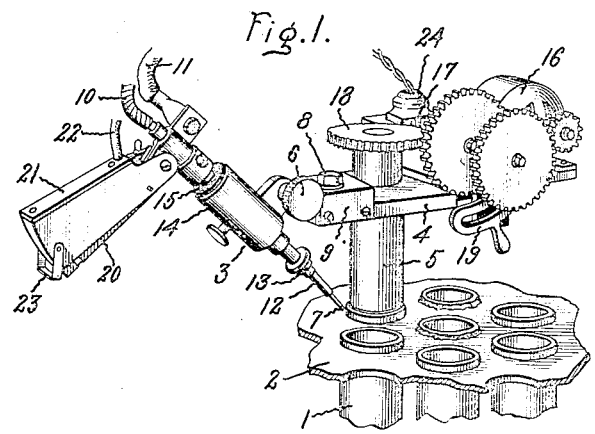
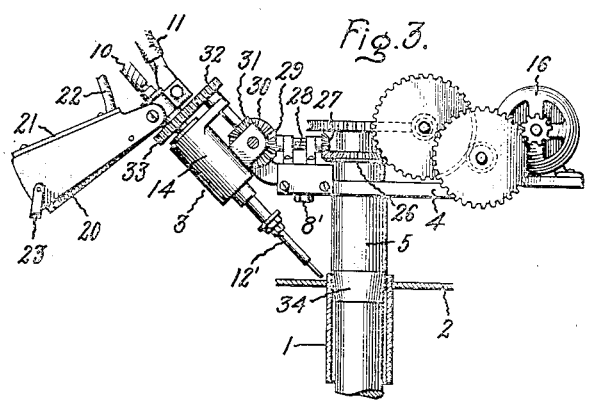
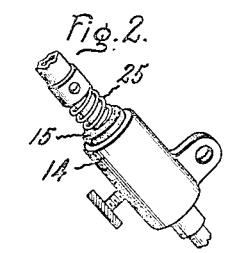
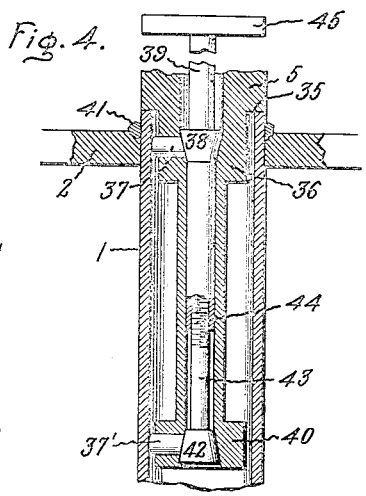
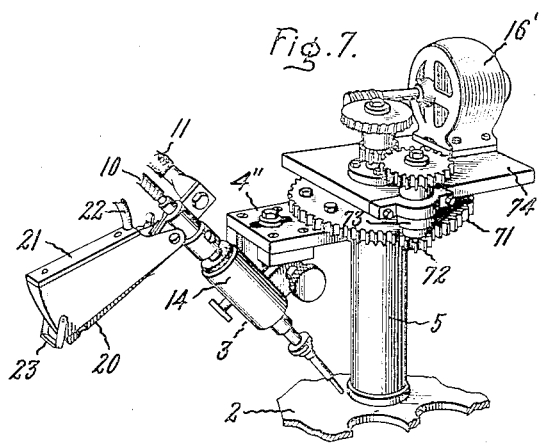
Inventor:
Charles E. Glasser,
by His Attorney

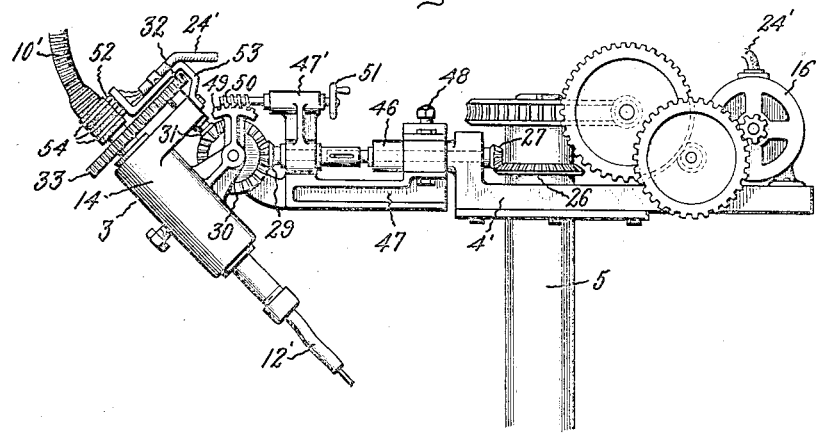
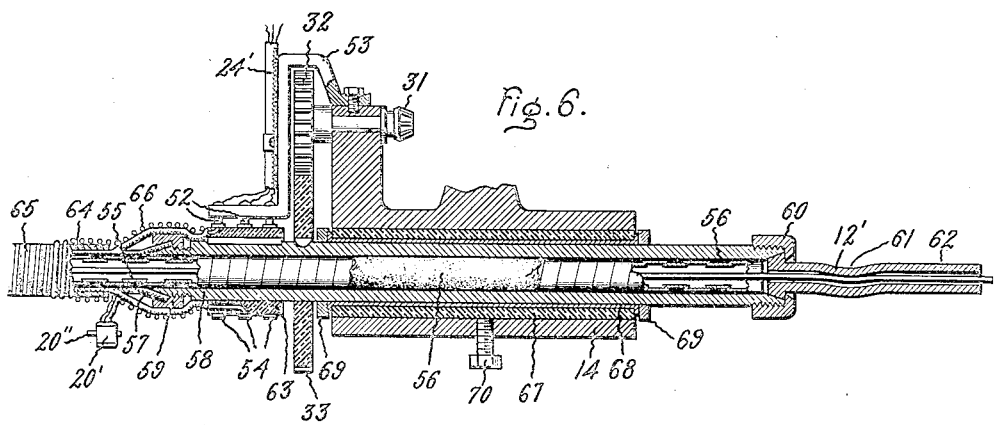

Sept. 16, 1924.

C. E. GLASSER 1,508,691

ELECTRIC ARC WELDING

Filed May 15, 1923      3 Sheets-Sheet 3

Inventor
Charles E. Glasser
by
His Attorney

Patented Sept. 16, 1924.

1,508,691

UNITED STATES PATENT OFFICE.

CHARLES E. GLASSER, OF SCHENECTADY, NEW YORK, ASSIGNOR TO GENERAL ELECTRIC COMPANY, A CORPORATION OF NEW YORK.

ELECTRIC-ARC WELDING.

Application filed May 15, 1923. Serial No. 639,196.

*To all whom it may concern:*

Be it known that I, CHARLES E. GLASSER, a citizen of the United States, residing at Schenectady, county of Schenectady, State of New York, have invented certain new and useful Improvements in Electric-Arc Welding, of which the following is a specification.

My invention relates to electric arc welding and particularly to an arrangement of apparatus for producing circular welds by the automatic metallic electrode electric arc welding process. In this process the arc is maintained between a continuous metallic electrode and the work, and the electrode and work are moved relatively to traverse the arc along the joint to be welded. One terminal of a suitable source of welding current is connected to the work and the other terminal connected to the welding electrode. Means are provided for automatically feeding the electrode toward the work at the proper rate of speed to maintain the arc length substantially constant during welding. Automatic means for controlling the rate of electrode feed are now well known which comprise means for controlling the rate of feed in accordance with some characteristic of the arc which varies with the arc length, for example, the voltage across the arc.

My invention utilizes a flexible guide tube for guiding the electrode from a suitable reel or source of supply to the welding tool. This idea of a flexible electrode guide tube is claimed broadly in the co-pending application of Paul O. Noble, Serial No. 487,875, filed July 27, 1921, assigned to the same assignee as the present application. A description of such a guide tube appears in the Illustrated Journal of the British Patent Office for September 27, 1922 (Patent 184,141).

My invention finds its greatest field of utility in the welding of boiler tubes and the like to the flue sheet or other plate to which the tubes are to be connected with a tight and strong joint but certain features of my circuit controlling arrangement are applicable generally to arc welding machines comprising means for automatically striking the arc and to arc welding machines comprising means for traversing the arc along the joint or work to be welded.

My invention will be better understood by reference to the following specification and accompanying drawings and its scope will be pointed out in the appended claims.

In the drawings, Fig. 1 shows in perspective an embodiment of my invention; Fig. 2 shows a detail of construction which may be embodied in the arrangement shown in Fig. 1; Fig. 3 shows modifications of my invention in which means are provided for rotating the welding tool to prevent twisting of the connections leading thereto; Fig. 4 shows in section a convenient construction for securing the support for the apparatus in a boiler tube to be welded. Fig. 5 shows a further modification of my invention; Fig. 6 is a sectional view showing the construction of the welding tool of Fig. 5 and the connections thereto; Fig. 7 shows a further modification of my invention, and Fig. 8 is a wiring diagram showing how the apparatus may be connected to a suitable welding circuit.

Referring to Fig. 1, the tubes 1 to be welded to the plate 2 are shown projecting a short distance through the plate 2. The welding tool 3 is mounted on a member 4 which is mounted for rotation on a support 5. The support 5 is shown as mounted in the end of one of the tubes to be welded. The angular relation of the tool 3 to the member 4 may be adjusted upon loosening the clamping nut 6 so as to vary the angle at which the electrode 7 is delivered to the work. This adjustment will also provide for varying the diameter of the weld made as the electrode 7 travels along the joint to be welded upon the turning of the member 4 about the support 5. The diameter of the weld may be independently adjusted upon loosening the bolt 8 thereby permitting the tool to be moved toward and from the support 5, a slot being provided to permit such movement. In the embodiment shown side plates 9 guide the slidable member clamped by the bolt 8. The welding electrode is fed to the welding tool through a flexible guide tube 10 which is suitably secured to the tool and welding current is led into the electrode at the tool. In the drawing, 11 represents the conductor which leads welding current into the tool and contact is made between the conductor and the tool by means of the curved electrode delivery nozzle 1⁵ suitably secured to the tool. The curve of the nozzle causes the electrode to bear tightly against the sides of the nozzle as it moves therethrough and a good electrical connection is thus produced. The angle at which the electrode is delivered to the work may also be adjusted by turning this curved nozzle so as to deliver this electrode in different directions, a suitable nut 13 being provided for securing the nozzle to the tool. The current carrying parts of the tool are insulated from the casing 14 by means of an insulating sleeve 15. The general construction of the tool will be more clearly apparent from the description hereinafter given in connection with Fig. 6 which shows a different modification that, however, possesses many features in common with the tool shown in Fig. 1. The idea of leading current into the electrode by means of a curved electrode nozzle is claimed broadly in my copending application Serial No. 502,625, filed September 23, 1921, assigned to the same assignee as the present application. A description of such a device also appears in the Illustrated Journal of the British Patent Office for November 15, 1922 (Patent 186,314). The welding tool is preferably rotated about the support 5 by means of an electric motor 16 mounted on the member 4. This motor, through suitable gearing, drives a worm 17 which engages with a worm wheel 18 fixed to the support 5. Upon rotation of the motor 16 the arm 4 is caused to travel around the support 5, the motor and welding tool moving therewith. In order to vary the speed of travel, means are provided for adjusting the gear ratio between the motor and worm 17, this means being shown as comprising the well known movable sector 19. The making and the breaking of the welding circuit are controlled by suitable means indicated as comprising a switch lever 20 mounted on a grip 21 secured to the welding tool. The lead containing the control wires is indicated at 22. The circuit connections will be more fully described hereinafter in connection with Fig. 8. When the lever 20 has been moved to close the control circuit for completing the welding circuit, the pivoted strap 23 may be moved to hold the switch 20 closed.

The operation of the arrangement shown in Fig. 1 is as follows:—The welding tool is adjusted to the desired position and the switch 20 closed thus closing the welding circuit. The automatic control for the electrode feeding mechanism then feeds the electrode through the tool into contact with the work and then withdraws the electrode to strike the arc. When the arc has reached a predetermined length, the direction of the electrode feed is again reversed and the electrode then fed toward the work at the proper rate to compensate for its consumption by the welding current, the arc being maintained at substantially constant length. The control mechanism will also automatically complete the circuit of the travel motor 16 as soon as a proper welding arc has been established and the travel motor will cause the arc to move along the circular seam to be welded and when the seam has been completed the welding circuit may be interrupted by opening switch 20 and the mechanism brought to a standstill. The circuit for the travel motor 16 is indicated as including a switch 24. This switch will be provided with indicating means such as arrows for showing the direction in which the motor was last operated. It will be apparent that as the tool travels around the work, the flexible electrode guide tube 10 and the conductors 10, 11 and 12 will be twisted once around for one revolution of the tool about the support 5. It is also apparent that this revolution will twist the conductors leading to the switch 24 and twist the conductors leading from this switch around the guide tube and conductors connected to the tool. Where the conductors and guide tube are of some length, this twisting for a single revolution will not be seriously objectionable but would be objectionable if several welds were completed in the same direction. The switch 24 or equivalent means is therefore provided in order that the direction of rotation of the tool about the support 5 may be changed between successive welds.

It is undesirable to make and break the arc in the line of the weld for the reason that a weak spot is produced both at the beginning and completion of the welding operation. It is, therefore, preferable to rock the welding tool 3 about the support 4 so that the arc will be started at one side of the joint to be welded, after which the tool will be adjusted and clamped by the nut 6 into proper position for welding. At the completion of the weld, the tool will be rocked to one side so as to break the circuit on the plate 2 at one side of the completed joint.

The arrangement by which the control mechanism automatically strikes the arc and sets the travel motor in operation will be more fully described hereinafter in connection with Fig. 8.

It is not essential that the arc be automatically struck in the arrangement shown in Fig. 1 and a convenient arrangement of the tool for permitting manual striking of the arc is indicated in Fig. 2, which shows a spiral spring 25 normally holding the part of the tool carrying the electrode delivery nozzle in a retracted position. The operator may thus grasp the grip 21, close the switch 20 and simultaneously push the tool toward the work against the action of the spring 25 and then withdraw the electrode to strike the arc.

In the modification shown in Fig. 3 means are provided for rotating the welding tool about its own axis as the tool rotates about the support. Suitable gearing is provided for this purpose and the ratio of the gearing is arranged so that the tool is rotated backwardly about its own axis, one revolution for one revolution of the tool forwardly about the support. In this way twisting of the flexible guide tube and conductors leading to the welding tool is prevented. To accomplish this result a gear 26 mounted on the support 5 drives the pinion 27, the shaft of which is slidably connected by a pin and slot connection 28 to the shaft of the pinion 29 which drives the bevel gear 30 which in turn drives the bevel gear 31, the shaft of which drives the spur gear 32 which drives the spur gear 33 which turns the welding tool in the casing 14. The pin and slot connection 28 permits the distance of the welding tool from the support to be adjusted upon loosening the bolt 8'. The construction of the welding tool to permit its rotation is similar to the construction hereinafter described in connection with Fig. 6. Where the tool is rotated in this manner, the electrode delivery nozzle 12' should be arranged to deliver the electrode in a given direction notwithstanding the turning of the tool and the curve in the electrode delivery nozzle for securing good contact with the welding electrode should, therefore, be arranged as shown in Fig. 6. If a curved nozzle of the type shown in Fig. 1 is used, the end of the nozzle will describe one revolution during one weld and will, therefore, be on the line of the weld only at the beginning and end of the weld.

The support 5 may be secured in the tube to be welded in any desired manner. In Fig. 3 the support is represented as provided with a tapered portion 34 which causes the support to fit tightly into the tube.

Fig. 4 shows an arrangement whereby the support may be firmly engaged with the inner wall of the tube. The support 5 is provided with a shoulder 35 for engaging the end of the tube and limiting the movement of the support into the tube. The support is provided with a reduced extension 36 which is slightly smaller than the internal diameter of the tube to be welded. A plurality of pins 37 are mounted in openings in the projection 36, a tapered portion 38 on a rod 39 extending through the support co-acts with the pins 37 to force them into contact with the inside wall of the tube. A set of similar pins 37' are mounted at the inner end 40 of the support. Ordinarily each group of pins will comprise 3 pins equally spaced and suitable means are used to prevent the pins from falling out when the device is removed from a tube. The pins 37 which engage the tube close to the point where the weld 41 is made are preferably made of a metal which will stand considerable heating without damage or softening. The pins 37' cooperate with a tapered portion 42 on a rod 43 having a threaded connection 44 with the rod 39. A pin or key may be provided to prevent the rod 43 from turning. When the rod 39 is turned in one direction the tapered portions 38 and 42 are drawn toward each other thus forcing the pins 37 and 37' into engagement with the inside wall of the tube to be welded. When the rod 39 is turned in the opposite direction the tapered portions 38 and 42 move away from each other to permit the pins to be retracted so that the support may be removed from the tube. The rod 39 will extend up through the top of the support 5 and a head 45 may be provided for turning the rod 39. This head will be located above the gear 18 of Fig. 1 for example, and be readily accessible. With this arrangement the support is pushed into the tube until the shoulder 35 on the support engages the end of the tube, after which the head 45 is turned to project the pins 37 and 37' and clamp the support firmly in place. It is apparent that it is not essential that the shoulder 35 engage the end of the tube since the pins can clamp the support in any position. Ordinarily, however, the end of the tube will form a convenient stop for locating the support in the correct position.

It is apparent that with the arrangement shown in Fig. 3 there is no twisting of the electrode guide tube 10 and the cables connected to the welding tool, but the turning of the tool about the support 5 tends to twist the tube and cables about the conductors which lead current to the travel motor 16. The arrangement shown in Fig. 5 utilizes the feature of a welding tool rotatable about its own axis to provide means for leading current into the travel motor 16 in such a way as to avoid all difficulty with twisting the conductors so that any number of welds may be made in the same direction without inconvenience from such twisting. The arrangement of Fig. 5 also enables certain further adjustments of the welding tool to be effected. The general arrangement is similar to that of Fig. 3. In the case of Fig. 5, however, the support 4' is provided with a hub 46 which provides a bearing for the shaft of pinion 27 which engages the gear 26. The welding tool is mounted on an arm 47 rotatably and longitudinally adjustable upon the hub 46. It is apparent that when the arm 47 is rotatably adjusted on the hub 46 the angular relation of the welding tool may be readily adjusted so that the electrode may be given any inclination with respect to the line of the weld. That is, the electrode may be made to trail or point into the work at any desired angle tangential to the line of the weld, and this angle will be maintained as the tool rotates about the support 5. If the arm 47 is adjusted longitudinally on the hub 46, the diameter of the weld will be changed. In the drawing, a set-screw 48 is shown for securing the arm 47 to the hub 46 in any desired position of adjustment. It will be apparent, however, to those skilled in the art that many arrangements may be provided for securing the longitudinal and rotatable adjustment between the members 46 and 47. It will be observed that the rotatable adjustment is in a plane at right angles to the line of longitudinal adjustment. The gearing for imparting rotation to the welding tool is the same as in the arrangement of Fig. 3. Since the point about which the welding tool is adjusted is in the axis of the pinions 27 and 29, it is apparent that the gear 30 will remain in mesh with the pinion 31 for all positions of adjustment. The means for adjusting the angular relation between the welding tool and the member 4' is, in Fig. 5, shown as comprising a toothed sector 49 connected to the casing 14 of the welding tool which cooperates with the worm 50 adjustable by means of a hand wheel 51 mounted in a projecting portion 47' of the arm 47. It will be observed that this last adjustment is in a plane at right angles to the plane of rotatable adjustment about the hub 46.

In the arrangement of Fig. 5, the cable 24' carrying the conductors for the motor 16 leads to insulated brushes 52 mounted on a bracket 53 secured to the member carrying the casing 14 of the welding tool. These brushes engage slip rings 54 which are connected to conductors embodied in the flexible guide tube 10'.

The construction of the welding tool shown in Fig. 5 will be more readily understood from Fig. 6 which shows most of the parts of the tool in section and shows a simple arrangement for making the necessary electrical connections. The flexible electrode guide tube comprises a metallic hose made of interlocked sections 55. This flexible steel tube is provided with a layer of insulation 56 upon which is braided or twisted a copper conductor 57 which carries the welding current. The conductor 57 is secured to a metal body member 58 of the tool by means of a nut 59 threaded onto the member 58 and provided with a tapered surface which cooperates with a corresponding tapered surface on member 58. The electrode delivery nozzle 12' is shown as secured to the member 58 of the tool by means of a nut 60. The nozzle may, however, be threaded directly into the end of tube 58. The delivery nozzle is clamped firmly against the member 58 and since the insulation 56 extends to the nozzle end of the member 58, the welding current first reaches the electrode at the nozzle. The insulation 56 within the member 58 does not need to be flexible and may therefore here consist of a mica tube which is better adapted to stand the heat. The nozzle is provided with a bend 61 and a straight portion 62 so that as the electrode is forced through the nozzle by the electrode feeding mechanism, the electrode firmly engages the nozzle and makes good conducting engagement therewith. The straight portion 62 insures that the electrode is delivered in a straight line notwithstanding the fact that the nozzle has a curved portion. The slip rings 54 which are engaged by the brushes 52 mounted on and insulated from the bracket 53 are mounted on an insulating member 63 keyed to the member 58. The conductors 24' which lead current from the control source to the slip rings may be braided onto the guide tube along with the braided conductor 57. Two conductors are shown with their connections to the corresponding slip rings. The connection to the third ring does not appear in the sectional view. The control wires which lead to the switch 20' may also be provided on the flexible electrode guide tube. This switch 20' in Fig. 6 is indicated as an ordinary pendent switch having a transverse plunger 20'' which indicates when the switch is closed or open. The insulation 64 covers the braided conductor 57 and the control conductors and a suitable armor 65 covers this insulation. After the connections to the tool have been made as described, a tape or cord wrapping 66 may be applied to hold the conductors firmly in place.

The member 58 is insulated from the casing 14 of the tool by a suitable insulating sleeve 67 and a metal bearing member 68 is provided between the members 58 and 67 so that the bearing is between metal surfaces. Suitable collars 69 prevent longitudinal movement of the member 58 through the tool in this modification. The gear 33 which is keyed to the member 58 may be a fiber gear so that the member 58 is thereby insulated from the gear 32. The set-screw 70 secures the insulating sleeve 67 in the casing 14.

The operation of the arrangement shown in Fig. 5 will be apparent from the description which has already been given. As the motor 16 turns the welding tool about the support 5, the tool is rotated backwardly with respect to the casing 14 so that the electrode guide tube and conductors mounted thereon are not twisted by the rotation of the tool about the support. The slip rings 54 make one revolution with respect to the brushes 52 for one rotation of the tool about the support. It is apparent that the arrangement avoids all difficulty from twisting of not only the welding and control conductors but also the conductors which lead current to the travel motor 16.

It is apparent that the arrangements so far described are not limited to welding small tubes but may be used for producing circular welds of any diameter within the capacity of adjustment of the machine.

In the modification shown in Fig. 7, the motor 16' and the support therefor do not rotate about the support 5 but are fixed thereto. The member 4" which carries the welding tool is secured to the gear 71 which is mounted for rotation on the support 5. This gear 71 is driven around the support 5 by a pinion 72 driven through suitable gearing from the motor 16'. The shaft of the pinion 72 is mounted in a bearing 73 fixed to the support 74 for the motor 16'. The operation of the arrangement shown in Fig. 7 will be obvious without detailed description. It is apparent that as the gear 71 and arm 4" rotate about the support 5, the tube and conductors leading to the welding tool will twist about the conductors leading to the motor 16' but if successive welds are made in opposite directions, no serious difficulty will be experienced from such twisting.

It is, of course, apparent that in tube welding, where the support is removed after each weld is made, the apparatus may be turned around manually to untwist the conductors before the support is inserted into the next tube to be welded so that in this way successive welds may be made in the same direction if desired.

Fig. 8 shows my welding apparatus diagrammatically and illustrates one circuit arrangement which may be used for controlling the electrode feeding mechanism and the circuits leading from a suitable source of welding current to the apparatus. The generator 75 is illustrated as a 3-brush generator which may be of the type disclosed in the patent to Bergman, No. 1,340,004, filed May 11, 1920. In this type of generator the electromotive force between the main brush 76 and the auxiliary brush 77 is constant while the electromotive force between the auxiliary brush 77 and the other main brush 78 changes in value and direction in accordance with the condition of the arcs. The positive brush 76 is connected directly to the work 2 and the brush 78 is connected to lead current to the electrode. The circuit from the brush 78 leads through the contactor 79 to the operating winding of the series relay 80. The electrode feed motor armature 81 which drives the feed rolls 82 through suitable gearing not shown, feeds the electrode 7 from a suitable reel not shown into and through the guide tube 10 and the welding tool. The shunt relay 83, which is controlled by the arc voltage in the manner hereinafter set forth, cooperates with the series relay 80 to control the operation of the electrode feed motor and to control the circuit of the travel motor 16. The field winding 84 of the electrode feed motor is supplied from the constant voltage brushes of the generator whenever the contactor 79 closes, an interlock contact 85 being provided on this contactor to complete the motor field circuit when the contactor closes.

The remaining circuit connections shown in Fig. 8 may be most simply set forth by describing the operation of the system. When the operator closes the switch 20, a circuit is completed from the brush 77, through conductor 86, switch 20 and conductor 87 to the operating coil 88 of the contactor 79 and back to the positive brush 76 of the generator. This causes the contactor 79 to close thus closing the interlock contact 85 and energizing the field winding 84 of the electrode feed motor. If the electrode is separated from the work at this time the welding circuit will be open and the series relay 80 de-energized and, therefore, in the down position as shown. The shunt relay 83 will not be energized for the reason that its circuit is open at the contact 89 on the series relay. The contacts of the shunt relay 83 will, therefore, also be down and the contacts 90 and 96 of the shunt relay 83 will be closed in the down position. The contact 91 of the series relay 80 will also be closed. A circuit, is, therefore, completed to the electrode feed motor from the positive brush 76 through the resistor 92, contacts 91 and 90, through the armature 81 of the electrode feed motor in the up direction, through the contactor 79 to the negative brush 78 of the generator. Current also flows in shunt to the motor armature through the resistor 92' which is connected in parallel with the motor armature by contact 96. The welding circuit being open, the electromotive forces induced in the armature of the generator 75 add to produce full open circuit voltage in the generator as described in the Bergman patent heretofore referred to. The resistor 92 is set to such a value that the electrode motor operates to feed the electrode slowly into contact with the work and the combination of series resistor 92 and shunt resistor 92' produce a steady operation of the motor. When the electrode engages the work, the series relay 80 is energized by the current now flowing between the work and electrode and this relay moves to its up position and the contact 89 of the series relay completes the circuit of the shunt relay 83. The shunt relay 83 does not pick up, however, for the reason that as soon as the electrodes are in contact, the voltage is very low and insufficient to energize the shunt relay 83, which it will be observed is now directly connected between the electrode and work, the series coil 80 being of low resistance. When the relay 80 moved to its upper position, the contact 91 interrupted the circuit heretofore traced through the resistor 92 and now completes a circuit from the brush 78, through the contactor 79, armature 81 in the down direction, contact 90 of the shunt relay 83, contact 91, resistor 93 and conductor 94 to the auxiliary brush 77. During this phase of operation the voltage between the auxiliary brushes 77 and 78 is reversed so that brush 78 is positive with respect to brush 77 so that current traverses the armature 81 of the electrode feed motor in the direction just traced. This motor, therefore, reverses to withdraw the electrode from the work and strike the arc. As soon as the voltage across the arc reaches a predetermined value, the shunt relay 83 moves to its upper position and the contact 90 thereof interrupts the circuit just traced and completes a circuit from the brush 76, through the conductor 95, contact 90, the armature of the electrode feed motor in the up direction, through the contactor 79 to the brush 78. It will be observed that the circuit through the shunt resistor 92' is now open and that the armature 81 of the electrode feed motor is now connected directly across the arc without any resistance in series therewith. The circuit may be traced from the work 2, through conductor 95, contact 90, armature 81 and series coil 80 to the electrode. The arc voltage is, therefore, impressed directly upon the armature of the electrode feed motor which increases its speed when the arc tends to lengthen and decreases its speed when the arc tends to shorten, so that the electrode is fed at a rate to keep the arc at substantially constant length. A contact 96 is provided on the shunt relay 83 so that when this relay moves to its upper position, which it does when a normal welding arc has been established, the circuit of the travel motor 16 is completed. This circuit may be traced from the brush 77, through conductors 86 and 97, armature 16, contact 96 and conductor 95 to the brush 76. If the arc is interrupted, relay 80 drops out thus opening contact 89 thereby causing relay 83 to drop out and open the circuit of motor 16 at contact 96. If the arc is short circuited at the electrodes, relay 83 is deenergized and drops out opening the circuit of motor 16. Therefore the travel motor can operate only while the welding arc is established and is stopped when the arc is either broken or short circuited at the electrodes.

It will be observed that the control circuits for the contactor coil 88 and the motor 16 and the circuit for the field winding of the electrode feed motor 81 are supplied from the constant voltage brushes 76 and 77 while the relays 80 and 83 are controlled respectively by the current and voltage of the arc.

I do not claim broadly the use of circuit controlling means comprising relays provided with windings respectively in series with the electrodes and in shunt to the electrodes for controlling the direction of operation of the electrode feed motor, such subject-matter being disclosed and claimed in the application of Eugene R. Carichoff, Serial No. 680,728, filed December 14, 1923, for electric arc welding, assigned to the same assignee as the present application. The arrangement whereby the energization of the shunt relay cannot take place until the series relay has operated upon engagement of the electrodes is, however, novel with me. One of the important advantages of this arrangement is that both relays can be made to effect the circuit changes upon pick-up only. If the winding of the shunt relay is not kept deenergized by the series relay and is permanently connected across the electrodes, the shunt relay picks up first, then when the electrodes engage the series relay picks up and the shunt relay drops out. The shunt relay then picks up again when the arc has been established. A relay cannot readily be made to drop out as quickly as it can be made to pick up and my circuit controlling arrangement therefore not only eliminates one operation of the shunt relay during the arc striking operation, but also secures a very quick operation in a simple manner.

While I have illustrated a suitable circuit arrangement employing a three brush generator of the type disclosed in the Bergman patent, the connections may be readily changed to accommodate any desired type of source as shown in the copending application of Paul O. Noble, Serial No. 376,448, filed April 26, 1920, assigned to the same assignee as the present application, and also shown in British Patent 179,613 to the British Thomson-Houston Company, Ltd.

What I claim as new and desire to secure by Letters Patent of the United States, is—

1. An arc welding apparatus of the type wherein a continuous electrode is fed from a source of supply to a welding tool located at a distance from said source and wherein said tool is mounted to rotate about an axis to produce welds of circular character comprising in combinations means for rotating said tool about its own axis as it rotates about said first mentioned axis.

2. An arc welding apparatus comprising a member rotatable about an axis, a welding tool mounted on said member and arranged for rotation with respect thereto, and means for rotating said tool backwardly with respect to said member when said member rotates forwardly.

3. An arc welding apparatus comprising a support, a member rotatable thereon, a welding tool mounted on said member, a motor carried by said support for rotating said member on said support whereby circular welds may be made, means whereby said tool may be adjusted on said member to produce welds of different diameters and additional means whereby the angular relation between said tool and said member may be adjusted whereby the diameter of the weld and the inclination of the electrode with respect to the work may be independently adjusted.

4. An arc welding apparatus comprising a support, a member rotatable thereon, a welding tool mounted on said member, a motor carried by said support for rotating said member on said support whereby circular welds may be made, means whereby said tool may be adjusted along said member to vary the distance of said tool from said support, means whereby said tool may be adjusted about said member in a plane at right angles to the line of adjustment along said member, and means whereby the angular relation of said tool to said support may be made in a plane at right angles to the plane of adjustment about said member.

5. An arc welding apparatus comprising a support, a member rotatable thereon, means carried by said support adapted to be operated to rotate said member on said support, a welding tool carried by said member whereby circular welds may be made upon rotation of said member, means for supplying welding current to said tool comprising a conductor secured thereto, and means for rotating said welding tool with respect to said member as said member rotates upon said support whereby circular welds may be made without twisting said conductor.

6. An arc welding apparatus comprising a support, a member rotatable thereon, an electric motor carried by said support and arranged to rotate said member on said support, a welding tool carried by said member whereby circular welds may be made upon rotation of said member, means for supplying welding current to said tool comprising a conductor secured thereto, means whereby rotation of said tool with respect to said member is effected upon rotation of said member upon said support and means for supplying operating current to said motor comprising slip rings mounted on said tool and brushes carried by said member and connections therefrom to said motor whereby circular welds may be made without twisting said conductor and motor connections.

7. An arc welding apparatus of the type wherein means are provided for feeding a continuous metallic electrode to the arc to maintain the same and wherein a flexible electrode guide tube is arranged to guide the electrode from the feeding means to a welding tool to which the guide tube is secured, and wherein a member is provided for carrying the welding tool and moving it in a closed path to produce welds of circular character, characterized by the fact that means are provided for rotating the tool with respect to said member upon movement of the tool in said path whereby a circular weld may be made without twisting said tube.

8. A welding tool comprising a casing member by which the tool may be supported, a conducting member rotatably mounted in said casing member, means for insulating said conducting member from said casing member, a longitudinal opening through said conducting member through which a welding electrode may be fed, means whereby a welding conductor may be secured to one end of said conducting member and means at the other end of said conducting member for making contact with said electrode as it is fed through the tool whereby welding current may be conducted into the electrode.

9. An arc welding apparatus of the type wherein the welding arc is maintained between the work constituting one electrode and a welding pencil constituting the other electrode, comprising in combination a reversible electric motor for feeding the pencil toward and from the work to strike the arc and toward the work to maintain the arc, means for controlling the direction of operation of the motor comprising a series relay having a winding in series with the electrodes and a shunt relay having a winding responsive to the voltage across the electrodes, circuit controlling means controlled by the series relay for maintaining the shunt winding deenergized while the series winding is deenergized, contacts controlled by the series and shunt relays respectively for completing a circuit for operating the motor in a direction to feed the pencil into engagement with the work when both relays are deenergized, contacts controlled by the series and shunt relays respectively for completing a circuit for operating the motor in a direction to withdraw the pencil from the work to strike the arc when, upon engagement of the electrodes, the series winding is energized by current flowing through the electrodes, said circuit controlling means controlled by the series relay being arranged when the series winding is energized to connect the winding of the shunt relay across the electrodes whereby upon a predetermined arc voltage the shunt relay is operated to pick up position, and means whereby the shunt relay when picked up connects the motor across the arc for operation in a direction to feed the pencil toward the work to maintain the arc.

10. An arc welding apparatus wherein the welding arc is maintained between a pair of electrodes and wherein means are provided to move one of the electrodes into and out of engagement with the other to strike the arc, and wherein means are provided for traversing the arc along the work to be welded, characterized by the fact that means are provided for controlling the operation of the traversing means comprising a winding in series with the electrodes and a winding in shunt with the electrodes arranged to cooperate to control the operation of the traversing means and permit operation of the traversing means only when the welding arc is established.

11. An arc welding system of the type wherein the arc is maintained between the work constituting one electrode and a welding pencil constituting the other electrode, comprising in combination means whereby the pencil may be moved into contact with the work and separated therefrom to establish the welding arc, a motor for producing relative movement between the pencil and the work to traverse the arc along the joint to be welded and means for controlling the operation of the traversing motor comprising a relay having a winding in series with the electrodes, and a relay having a winding in shunt with the electrodes, said series relay being arranged to complete the circuit of the shunt winding only when the series relay is energized, said controlling means being arranged to maintain the circuit of the traversing motor completed when both relays are energized and to open the circuit of the traversing motor when the arc is either broken or short circuited at the electrodes.

In witness whereof I have hereunto set my hand this 11th day of May, 1923.

CHARLES E. GLASSER.